US012756910B2

(12) United States Patent
Kim et al.

(10) Patent No.: US 12,756,910 B2
(45) Date of Patent: Oct. 6, 2026

(54) CAMERA MODULE AND METHOD FOR MANUFACTURING SAME

(71) Applicant: HYUNDAI MOBIS CO., LTD., Seoul (KR)

(72) Inventors: Hyung Min Kim, Yongin-si (KR); Jae Hyung Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 26 days.

(21) Appl. No.: 18/826,773

(22) Filed: Sep. 6, 2024

(65) Prior Publication Data

US 2025/0330688 A1 Oct. 23, 2025

(30) Foreign Application Priority Data

Apr. 23, 2024 (KR) ........................ 10-2024-0054074

(51) Int. Cl.

| | |
|---|---|
| ***H04N 23/51*** | (2023.01) |
| ***G03B 30/00*** | (2021.01) |
| ***H04N 23/54*** | (2023.01) |
| ***H04N 23/55*** | (2023.01) |

(52) U.S. Cl.
CPC ............ *H04N 23/51* (2023.01); *G03B 30/00* (2021.01); *H04N 23/54* (2023.01); *H04N 23/55* (2023.01)

(58) Field of Classification Search
CPC ........ H04N 23/51; H04N 23/54; H04N 23/55; H04N 23/57; H04N 23/52; G03B 30/00
See application file for complete search history.

(56) References Cited

U.S. PATENT DOCUMENTS

2020/0409016 A1* 12/2020 Jiang ...................... G02B 7/025

FOREIGN PATENT DOCUMENTS

| | | | | |
|---|---|---|---|---|
| JP | 2007-306387 A | 11/2007 | | |
| KR | 10-2020-0107184 A | 9/2020 | | |
| KR | 20200107184 A * | 9/2020 | | G03B 17/55 |
| WO | 2023-027424 A1 | 2/2023 | | |

OTHER PUBLICATIONS

Camera Module (By Hee Jong Lee) (Year: 2020).*
Extended European Search Report issued on Jan. 2, 2025 in the corresponding European Patent Application No. 24190778.1.

* cited by examiner

*Primary Examiner* — Yogesh K Aggarwal
(74) *Attorney, Agent, or Firm* — Morgan, Lewis & Bockius LLP

(57) ABSTRACT

A camera module includes an image sensor, a circuit board on which the image sensor is mounted, a front body housing the image sensor and the circuit board inside and have an opening, and a rear body configured to include a core member that closes the opening, is coupled to the front body, is made of metal, and is joined to the front body, and a resin molded portion that is joined to the core member and is made of a synthetic resin.

16 Claims, 13 Drawing Sheets

CAMERA MODULE AND METHOD FOR MANUFACTURING SAME

CROSS-REFERENCE TO RELATED APPLICATION

This application claims priority from and the benefit of Korean Patent Application No. 10-2024-0054074, filed on Apr. 23, 2024, which is hereby incorporated by reference for all purposes as if set forth herein.

BACKGROUND

Field

Exemplary embodiments of the present disclosure relate to a camera module and a method for manufacturing the same, and more particularly, to a camera module and a method for manufacturing the same, which improve heat dissipation, electrostatic discharge, and electromagnetic shielding properties.

Description of the Related Art

Camera modules are devices that convert images captured through a lens into electrical signals. The range of applications thereof has expanded to include not only portable electronic devices such as smartphones and computer peripherals but also vehicles.

The camera module may include a housing, which has a front body and a rear body, and an image sensor positioned in an inner space of the housing. To prevent malfunction or failure of the camera module due to electrostatic discharge (ESD) and electromagnetic interference (EMI), the housing of the camera module may be made of metal.

The housing, made of metal, may be manufactured by die-casting or forging. However, when the housing is manufactured using die-casting, it is difficult to make the housing thin, which requires a significant amount of metal. As a result, the cost and weight of the camera module may increase. On the other hand, when the housing is manufactured using forging, the machining cost of the housing may increase and productivity may decrease.

The related art of the present disclosure is disclosed in Japanese Patent Publication No. 2007-306387 (published on Nov. 22, 2007 and entitled "CAMERA MODULE AND ITS MANUFACTURING METHOD").

SUMMARY

Exemplary embodiments of the present disclosure relate to a camera module and a method for manufacturing the same that prevent malfunction or failure due to overheating, electrostatic discharge, or electromagnetic interference, and reduce manufacturing costs.

In an aspect of the present disclosure, a camera module may include: an image sensor; a circuit board on which the image sensor is mounted; a front body housing the image sensor and the circuit board inside and have an opening; and a rear body configured to include a core member that closes the opening, is coupled to the front body, is made of metal, and is joined to the front body, and include a resin molded portion that is joined to the core member and is made of a synthetic resin.

The resin molded portion may include a coupling guide including a plurality of contact ribs contacting with an inner surface of the front body and spaced apart from each other.

The planar shape of the coupling guide may be a square shape with rounded corners, and the plurality of contact ribs may be provided at the corners of the coupling guide.

The camera module may further include a lens unit configured have at least one lens arranged to be aligned with an optical axis of the image sensor, wherein the front body may include a lens insertion hole into which the lens unit is inserted.

An end portion of the lens insertion hole and a bonding surface of the lens unit, which faces the end portion, may be bonded to each other using adhesive. The lens insertion hole may include an overflow prevention wall, positioned at the end portion and protruding along a closed curved path centered on the optical axis, and an adhesive reservoir groove formed from the overflow prevention wall in a stepped manner and positioned farther from the optical axis than the overflow prevention wall.

The lens insertion hole may further include a plurality of outer circumferential protrusions protruding from the end portion in a stepped manner compared to the bottom of the adhesive reservoir groove, and an uneven portion wherein plurality of outer circumferential grooves, formed from the plurality of outer circumferential protrusions in a stepped manner, are arranged alternately, the uneven portion positioned farther from the optical axis than the adhesive reservoir groove.

The adhesive may be cured when irradiated with ultraviolet (UV) rays. A gap between the end portion of the lens insertion hole and the bonding surface of the lens unit may widen as a distance from the optical axis increases.

A depth of the adhesive reservoir groove and a depth of the outer circumferential groove may increase as a distance from the optical axis increases and a height of the outer circumferential protrusion may decrease as a distance from the optical axis increases.

An angle of tilt of the adhesive reservoir groove, an angle of tilt of the outer circumferential groove, and an angle of tilt of the outer circumferential protrusion may range from 2° to 6°.

The front body may be made of metal, and the front body and the core member may be welded together.

The welding may be a laser welding.

The rear body may further include a connector configured to be electrically connected with the circuit board, and the resin molded portion may further include a connector protector configured to surround the connector and be joined to the connector.

The circuit board may further include a circuit board terminal protruding from the circuit board for transmitting an electrical signal generated by the image sensor to outside the camera module and be connected with the connector.

The connector may include a communication pin configured to be inserted into the circuit board terminal, an insulation portion configured to surround the communication pin and be made of an insulating material, and a metal tube that is made of metal, is spaced apart from the communication pin, surrounds the insulation portion, and is joined to the connector protector.

The core member may include contact protrusions configured to be electrically connected with the metal tube.

In another aspect of the present disclosure, a method for manufacturing a camera module may include: mounting an image sensor to mount the image sensor on a circuit board; coupling a circuit board to couple the circuit board to a front body, such that the circuit board is housed in an inner space of the front body, made of metal; preparing a rear body to prepare the rear body that has a core member, made of metal, and a resin molded portion, made of a synthetic resin and bonded to the core member; and joining a rear body to join the rear body to the front body by welding the core member and the front body.

The preparing of a rear body may include an insert injection molding, wherein the core member is insert-fitted inside an injection molding die and molten synthetic resin is injected into the injection molding die and hardened.

The core member may include bonding reinforcement grooves on the surfaces, thereby enlarging the bonding surface area between the resin molded portion and the core member.

The front body may include a lens insertion hole. The method may further include bonding a lens unit by inserting the lens unit, which has at least one lens, into the lens insertion hole and bonding an end portion of the lens insertion hole to a bonding surface of the lens unit, which faces the end portion, using adhesive.

The bonding of a lens unit may include injecting the adhesive between the end portion of the lens insertion hole and the bonding surface of the lens unit, and irradiating the adhesive with UV rays.

In the embodiments of the present disclosure, the front body and the core member of the rear body surround the circuit board and the image sensor. This may improve heat dissipation efficiency, allow external electrostatic discharge to bypass the circuit board and the image sensor and be discharged to outside the camera module, and shield against external electromagnetic interference. Therefore, malfunction or failure of the camera module due to overheating, electrostatic discharge, or electromagnetic interference may be prevented.

Since the rear body includes both the core member, made of metal, and the resin molded portion, made of a synthetic resin, the manufacturing cost of the camera module may be reduced, and the weight may be reduced compared to cases where the rear body is made solely of metal.

DETAILED DESCRIPTION OF THE ILLUSTRATED EMBODIMENTS

Embodiments of a camera module and a method for manufacturing the same according to the present disclosure will be described hereinafter in detail with reference to the accompanying drawings. The terminology used herein is intended to appropriately describe preferred embodiments of the present disclosure and may vary depending on the intentions of the user or operator or the conventions of the field to which the present disclosure pertains. Therefore, the definition of the terminology should be made according to the overall disclosure set forth herein.

Figure 1:
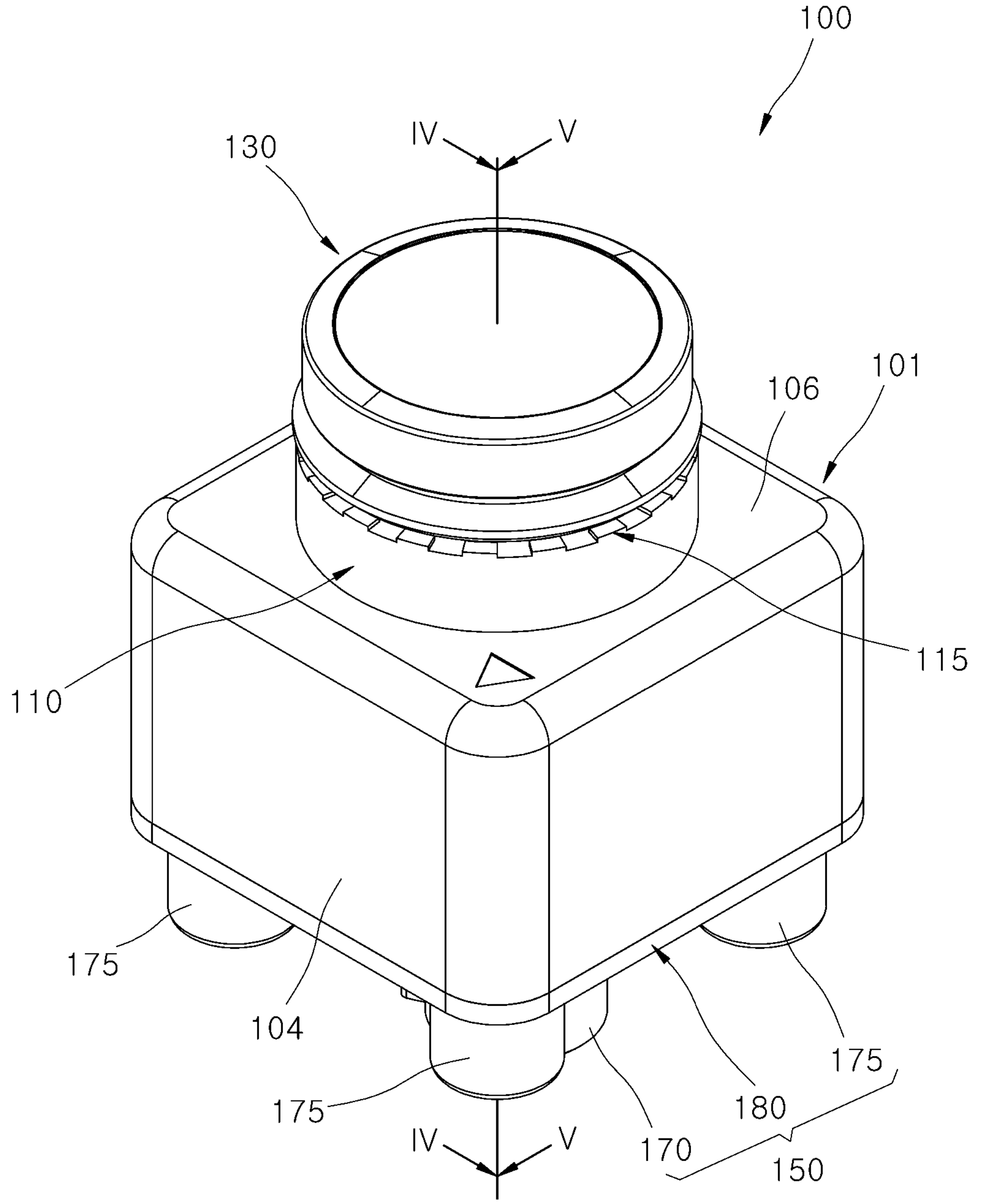
FIG. 1 is a perspective view of a camera module according to an embodiment of the present disclosure.
Figure 2:
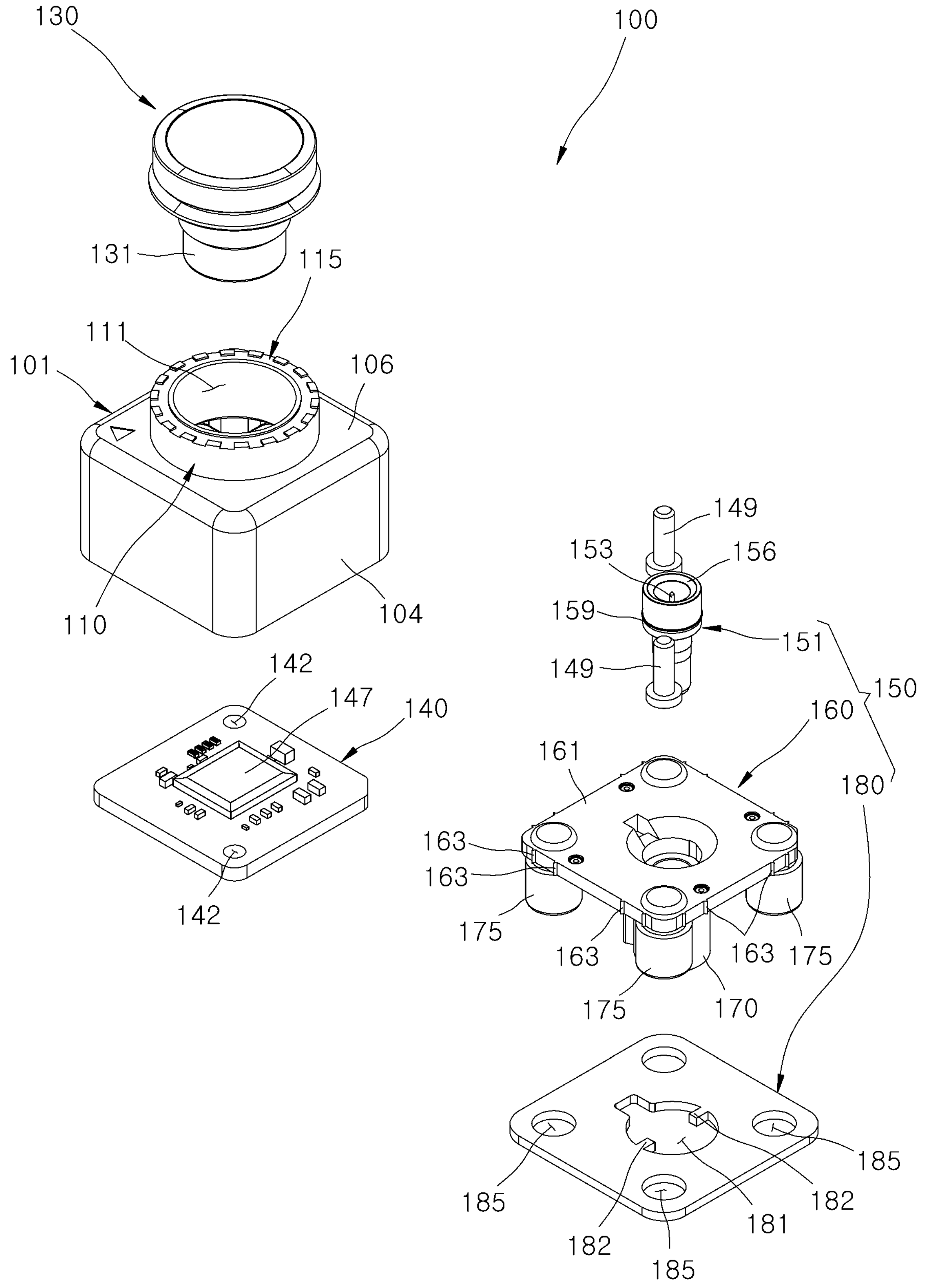
FIG. 2 is an exploded perspective view of the camera module of FIG. 1 viewed from above.
Figure 3:
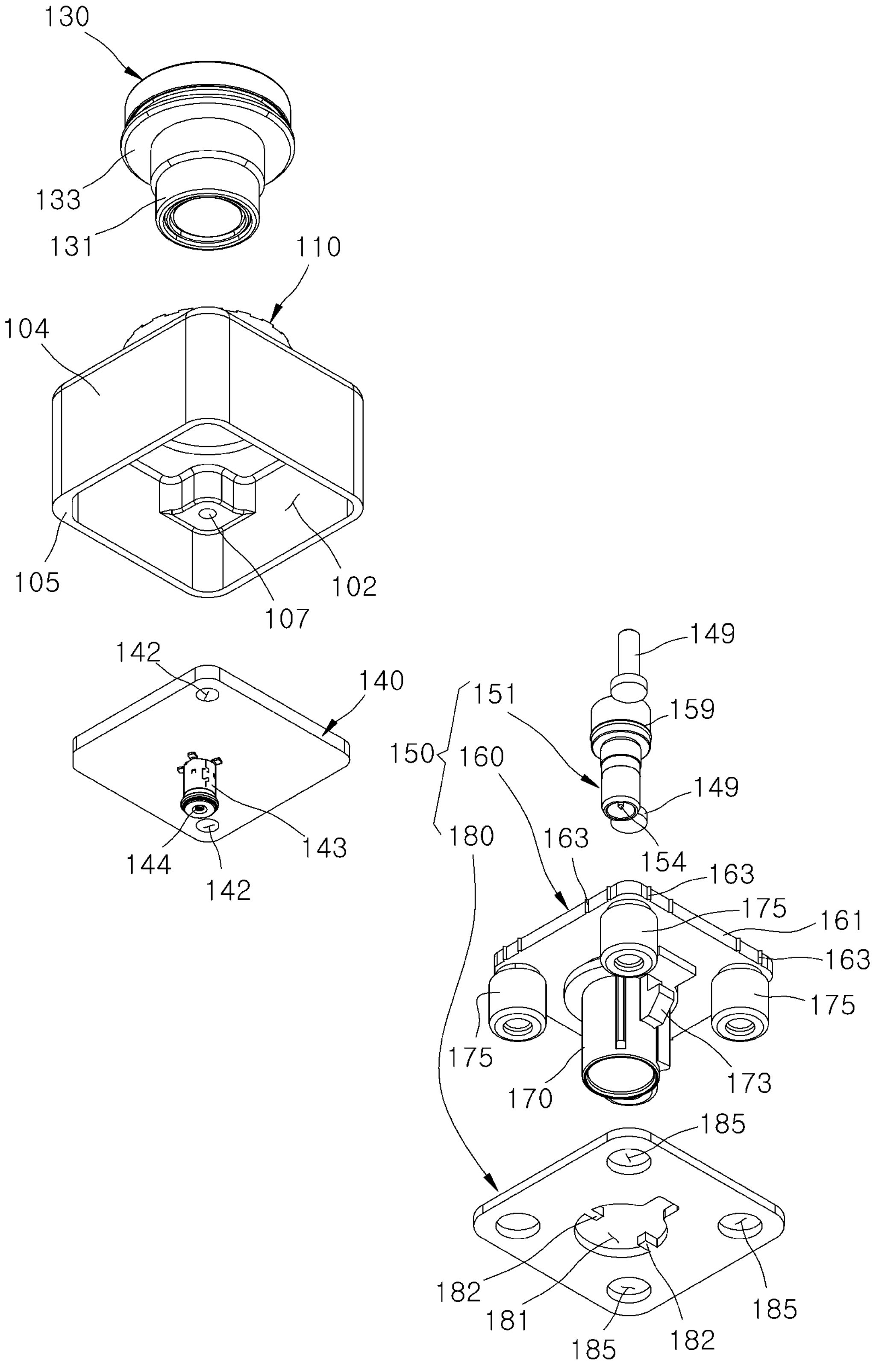
FIG. 3 is an exploded perspective view of the camera module of FIG. 1 viewed from below.
Figure 4:
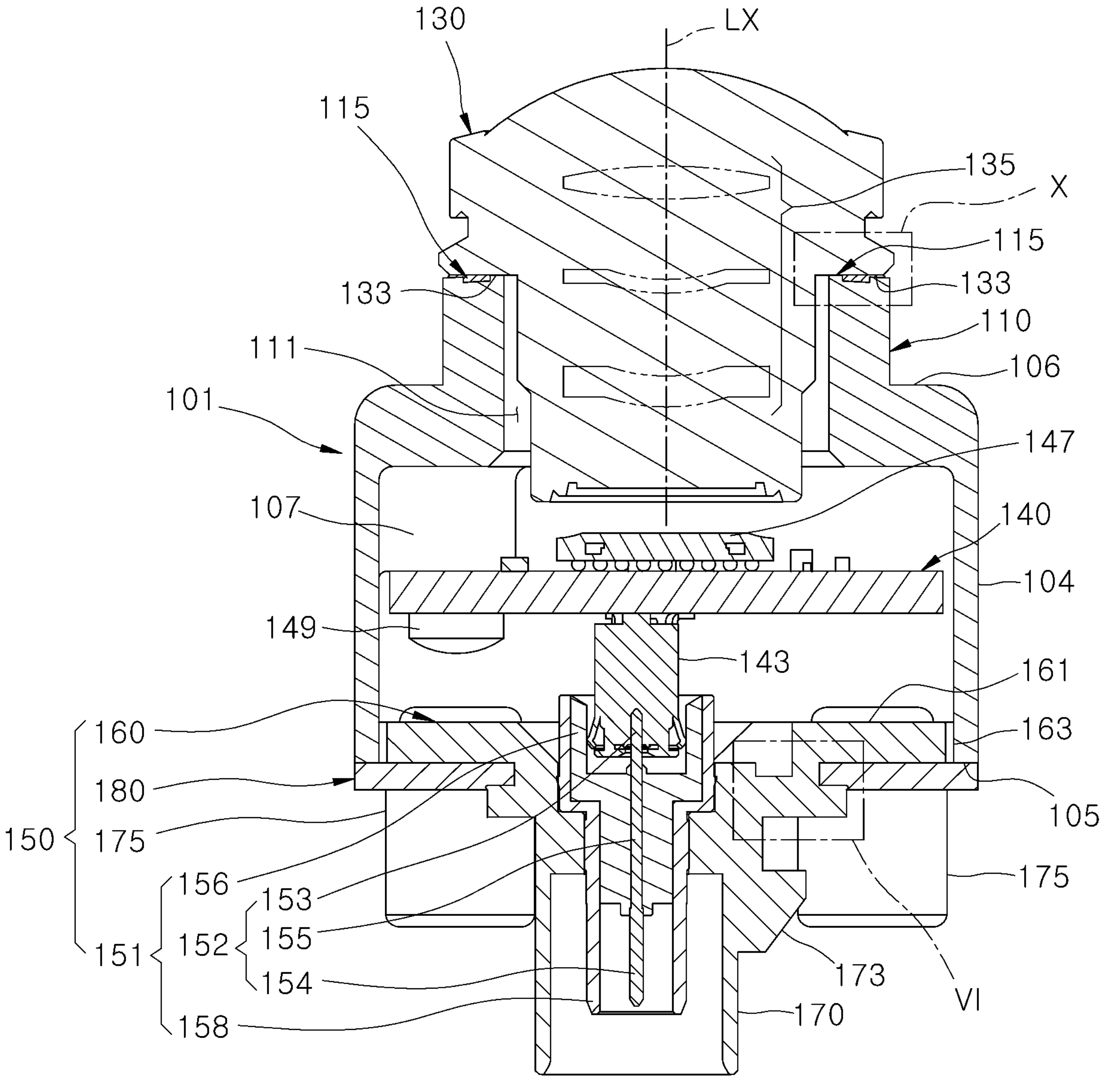
FIG. 4 is a cross-sectional view taken along line IV-IV of FIG. 1.
Figure 5:
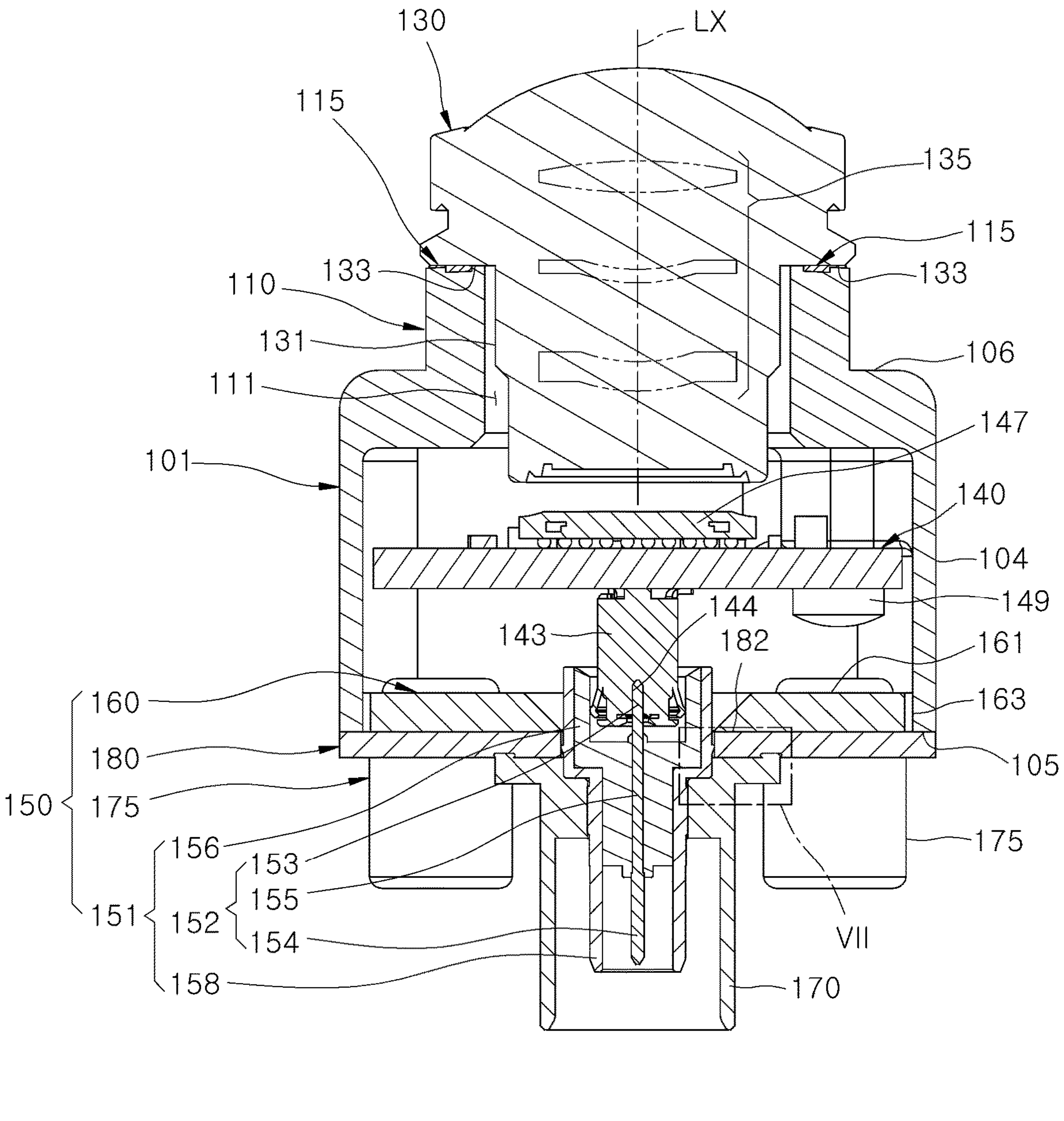
FIG. 5 is a cross-sectional view taken along line V-V of FIG. 1.
Figure 6:
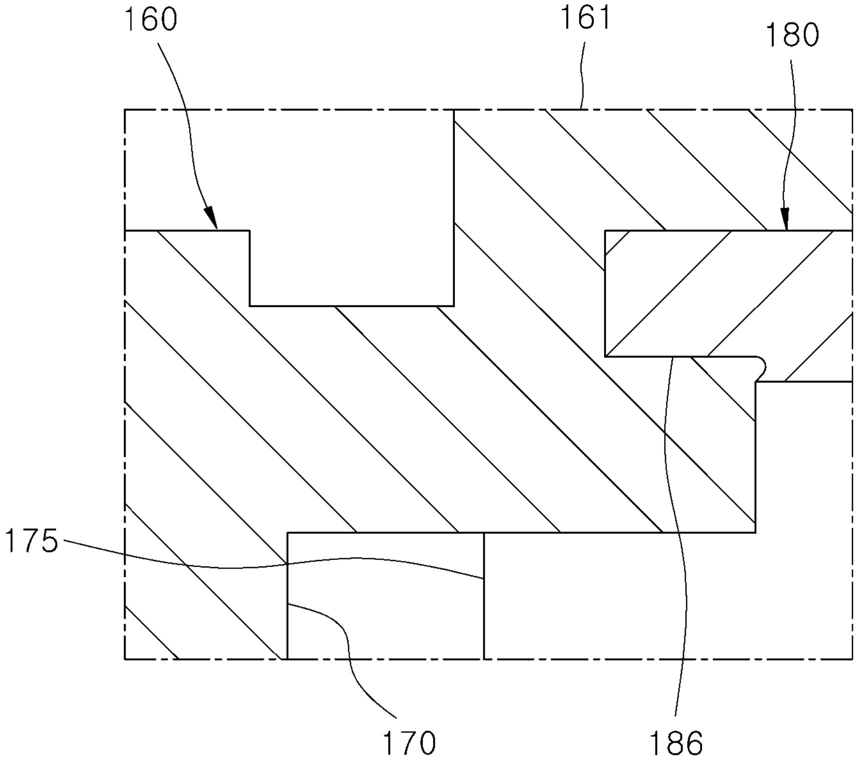
FIG. 6 is an enlarged cross-sectional view of portion VI shown in FIG. 4.
Figure 7:
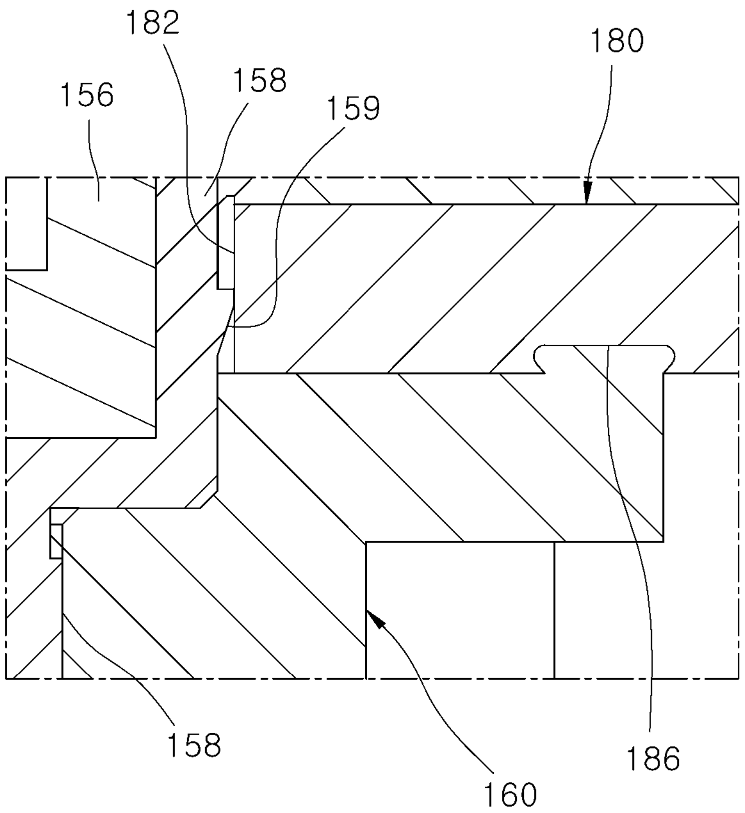
FIG. 7 is an enlarged cross-sectional view of portion VII shown in FIG. 5.
Figure 8:
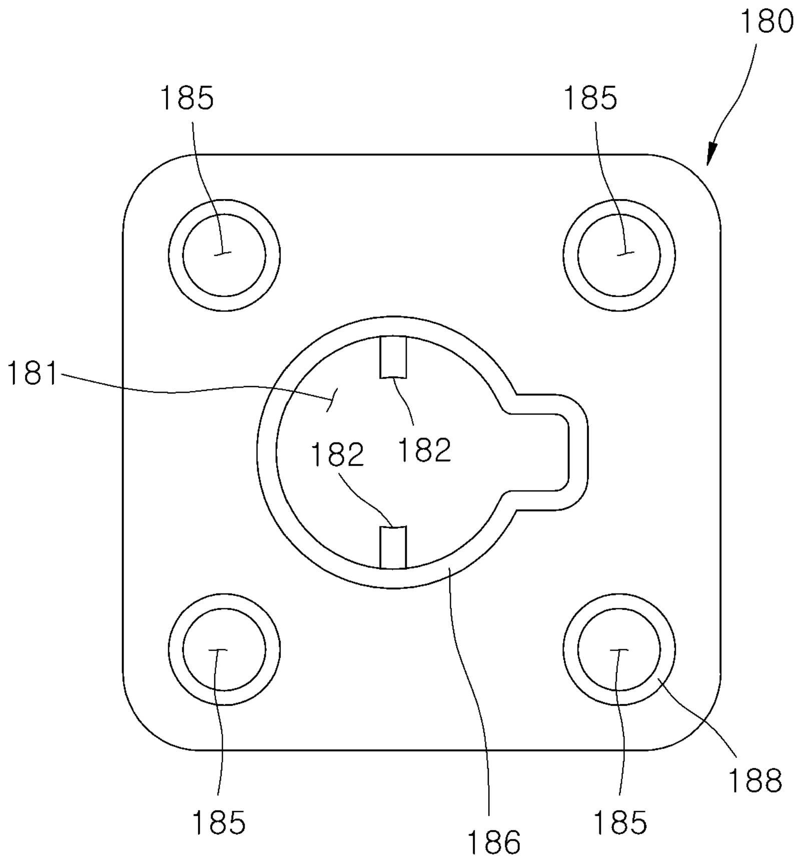
FIG. 8 is a bottom view of a core member of FIG. 3.
Figure 9:
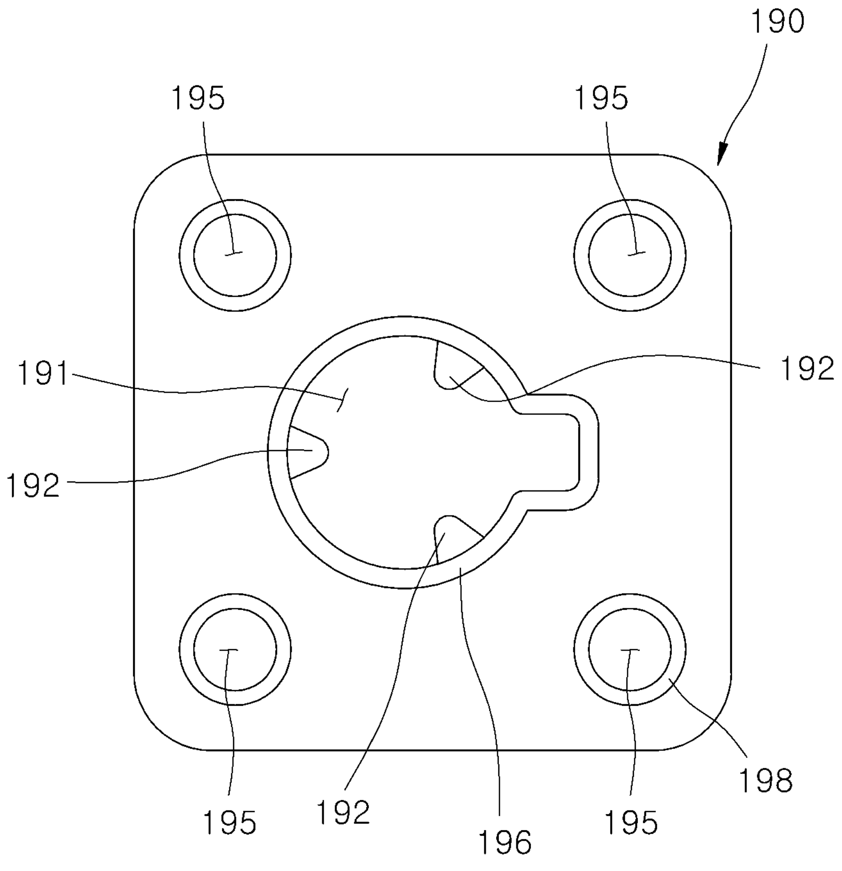
FIG. 9 is a bottom view of another example of a core member that may replace the core member of FIG. 8.
Figure 10:
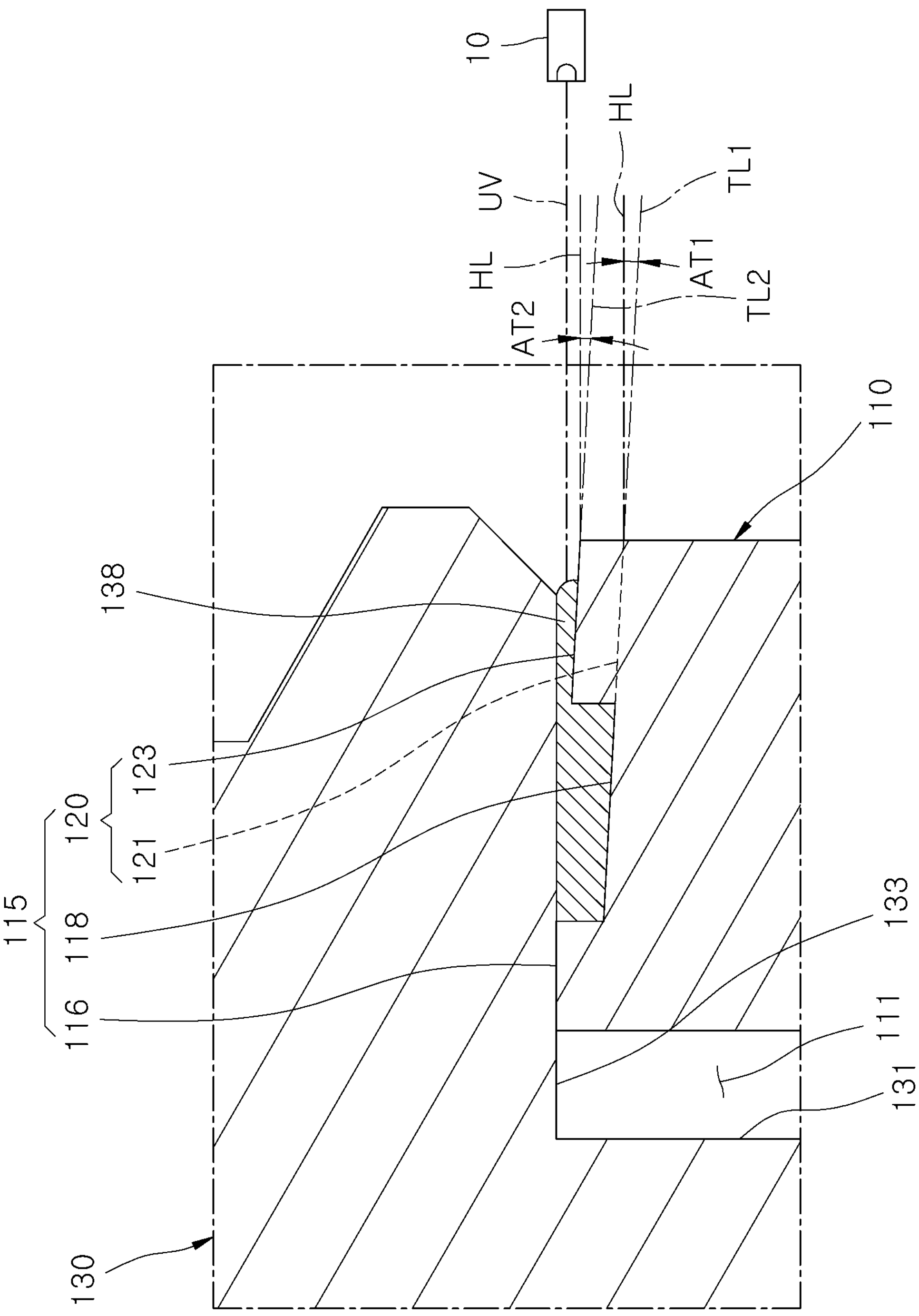
FIG. 10 is an enlarged cross-sectional view of portion X shown in FIG. 4.
Figure 11:
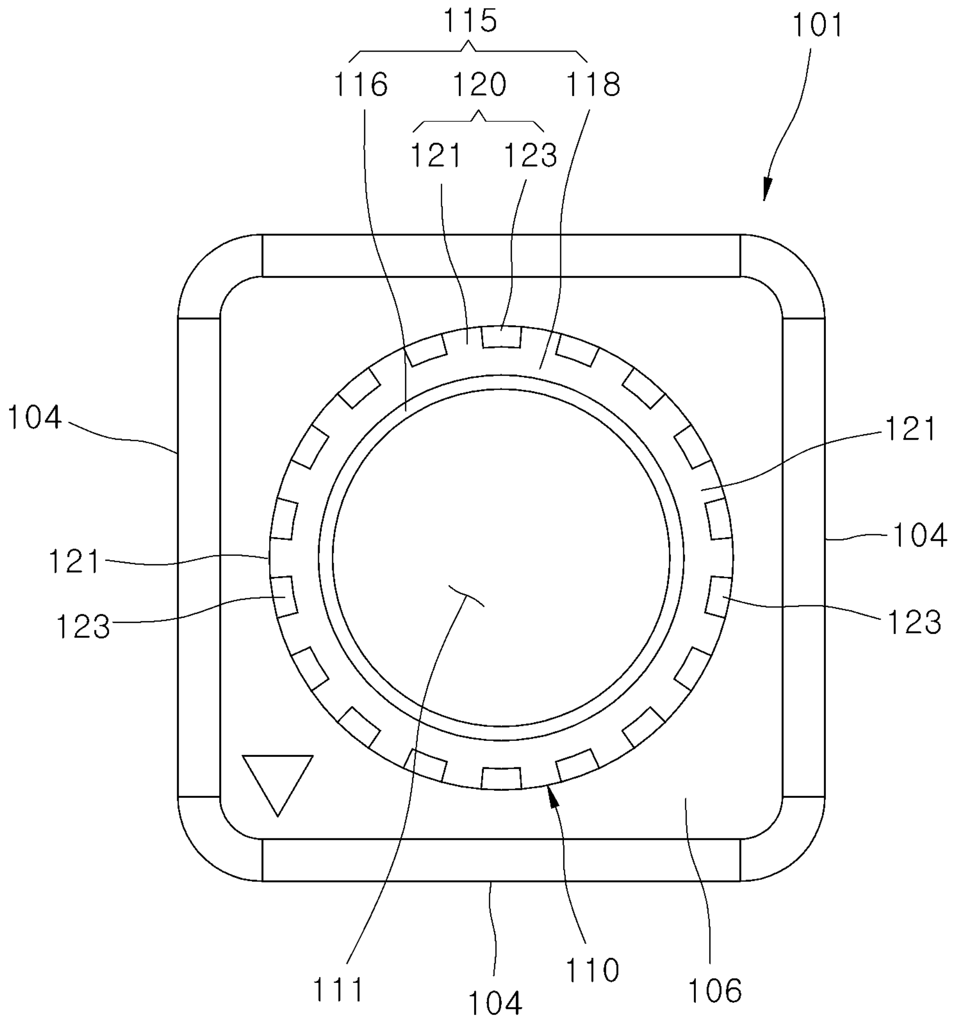
FIG. 11 is a top view of a front body of FIG. 2.
Figure 12:
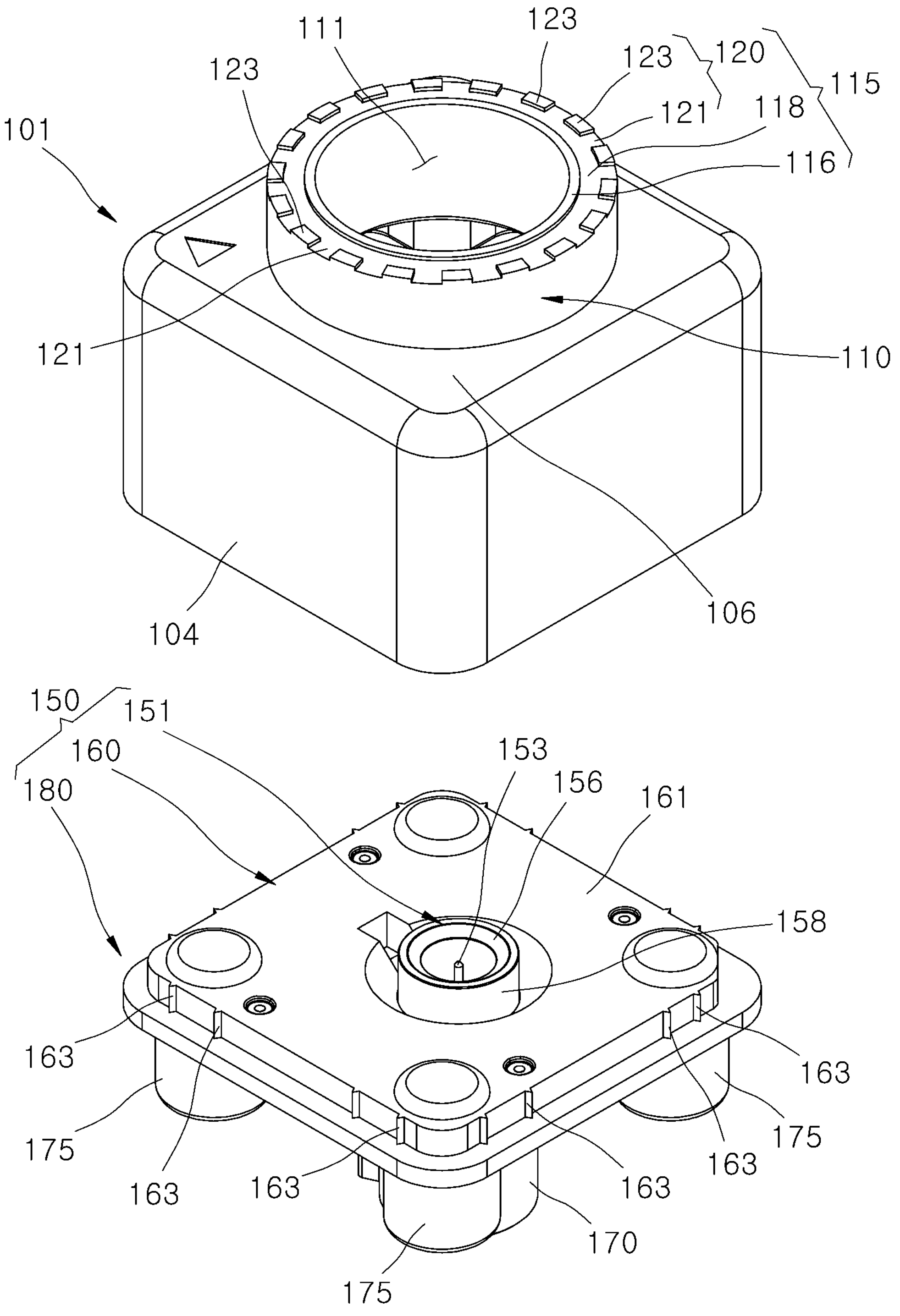
FIG. 12 is an exploded perspective view showing a front body and a rear body extracted from the camera module of FIG. 1.

FIG. 1 is a perspective view of a camera module according to an embodiment of the present disclosure. FIG. 2 is an exploded perspective view of the camera module of FIG. 1 viewed from above. FIG. 3 is an exploded perspective view of the camera module of FIG. 1 viewed from below. FIG. 4 is a cross-sectional view taken along line IV-IV of FIG. 1. FIG. 5 is a cross-sectional view taken along line V-V of FIG. 1. FIG. 6 is an enlarged cross-sectional view of portion VI shown in FIG. 4. FIG. 7 is an enlarged cross-sectional view of portion VII shown in FIG. 5. FIG. 8 is a bottom view of a core member of FIG. 3. FIG. 9 is a bottom view of another example of a core member that may replace the core member of FIG. 8. FIG. 10 is an enlarged cross-sectional view of portion X shown in FIG. 4. FIG. 11 is a top view of a front body of FIG. 2. FIG. 12 is an exploded perspective view showing a front body and a rear body extracted from the camera module of FIG. 1.

Referring to FIGS. 1 to 12, a camera module 100 according to an embodiment of the present disclosure includes an image sensor 147, a circuit board 140, a front body 101, and a rear body 150. The camera module 100 may be installed in a vehicle to collect information and capture images to assist in vehicle operation.

The image sensor 147 converts light corresponding to an image received on the front surface into an electrical signal. The image sensor 147 may be mounted on the center of the front surface of the circuit board 140 using surface mount technology (SMT). Although not clearly shown in the drawing, other elements or other semiconductor chip packages, in addition to the image sensor 147, may be mounted on the front and back surfaces of the circuit board 140.

The front body 101 includes a side wall 104 and a front wall 106 that define an inner space 102. The image sensor 147 and the circuit board 140 are housed in the inner space 102 of the front body 101. The front body 101 includes an opening through which the image sensor 147 and the circuit board 140 are housed in the inner space 102.

The camera module 100 may further include a lens unit 130, which includes a plurality of lenses 135 arranged to be aligned with an optical axis LX of the image sensor 147. The front body 101 may further include a lens insertion hole 110 into which the lens unit 130 is insert-fitted. The lens insertion hole 110 may protrude forward from the front wall 106 in a ring shape.

The lens unit 130 may include a barrel 131 configured to extend toward the optical axis LX, on which the lenses 135 are supported, and a bonding surface 133 configured to expand radially from the barrel 131 and face an end portion 115 of the lens insertion hole 110. The lens unit 130 may have a front through-hole 111 into which the barrel 131 is inserted. The end portion 115 of the lens insertion hole 110 may be a front end portion. In FIGS. 4 and 5, the lens 135 is provided in plural, but contrary to what is shown in the drawings, the lens unit 130 may include only a single lens.

As shown in FIG. 10, the end portion 115 of the lens insertion hole 110 and the bonding surface 133 may be bonded to each other using adhesive. In other words, the adhesive may be cured to form a bonding layer 138 between the end portion 115 and the bonding surface 133.

The lens insertion hole 110 may include an overflow prevention wall 116, an adhesive reservoir groove 118, and an uneven portion 120 at the end portion 115. The overflow prevention wall 116 protrudes forward in a stepped manner along a closed curved path centered on the optical axis LX. For example, the overflow prevention wall 116 may extend along a circular path centered on the optical axis LX.

The adhesive reservoir groove 118 is a stepped recess from the overflow prevention wall 116, positioned farther from the optical axis LX than the overflow prevention wall 116. The uneven portion 120 is positioned farther from the optical axis LX than the adhesive reservoir groove 118 and includes multiple outer circumferential protrusions 123 and multiple outer circumferential grooves 121.

Each outer circumferential protrusion 123 may protrude forward in a stepped manner compared to the bottom of the adhesive reservoir groove 118. Each outer circumferential groove 121 is a stepped recess from the outer circumferential protrusion 123. For example, the multiple outer circumferential protrusions 123 and the multiple outer circumferential grooves 121 may have a larger diameter than the circular path of the overflow prevention wall 116 and may be arranged alternately along a concentric circular path centered on the optical axis LX. The bottom of the adhesive reservoir groove 118 and the bottoms of the multiple outer circumferential grooves 121 may be connected continuously without a step.

When a flowable adhesive is injected into the end portion 115, the adhesive reservoir groove 118 is filled. When the barrel 131 of the lens unit 130 is inserted into the front through-hole 111, the bonding surface 133 comes close to the end portion 115. This allows the adhesive to be pressed and spread onto the bonding surface 133. However, the overflow prevention wall 116 confines the adhesive, preventing the adhesive from spreading onto the inner circumferential surface of the front through-hole 111. Instead, the adhesive may spread into multiple outer circumferential grooves 121.

The adhesive, cured to form the bonding layer 138, may include an epoxy resin. The adhesive may be a thermosetting adhesive, which is applied at room temperature in a flowable state and cured when heated above room temperature. The thermosetting adhesive may be cured when heated to a range of temperatures, such as 80° C. to 100° C.

The adhesive may be either a UV-curable adhesive, cured when irradiated with ultraviolet (UV) rays, or a so-called "hybrid adhesive," cured when heated and when irradiated with UV rays. When the adhesive is the hybrid adhesive, the rate of curing by UV irradiation may be faster than the rate of curing by heating.

In the case where the hybrid adhesive is used as the adhesive, a flowable adhesive is applied to the end portion 115. The barrel 131 of the lens unit 130 then is inserted into the front through-hole 111, bringing the bonding surface 133 close to the end portion 115. Subsequently, UV irradiation is directed toward the adhesive from outside the front body 101 and the lens unit 130 using a UV irradiator 10. As a result of this UV exposure, the adhesive may be rapidly cured to form the bonding layer 138.

Heating the front body 101 and the lens unit 130 during or after UV irradiation may further cure any adhesive areas that remain unexposed to UV irradiation. Such unexposed areas may occur due to a narrow gap between the end portion 115 and the bonding surface 133, or because some areas are shielded from UV irradiation by the outer circumferential protrusion 123.

To increase an amount of UV light incident on the adhesive applied between the end portion 115 and the bonding surface 133, a gap between the end portion 115 and the bonding surface 133 may widen as a distance from the optical axis LX increases. For example, a depth of the adhesive reservoir groove 118 from the front end of the overflow prevention wall 116 to the bottom of the adhesive reservoir groove 118 may increase as a distance from the optical axis LX increases. A depth of the outer circumferential groove 121 from the front end of the overflow prevention wall 116 to the bottom of the outer circumferential groove 121 may also increase as a distance from the optical axis LX increases. A height of the outer circumferential protrusion 123 from the bottom of the outer circumferential groove 121 to the front end of the outer circumferential protrusion 123 may decrease as a distance from the optical axis LX increases.

An angle of tilt AT1 of the adhesive reservoir groove 118, an angle of tilt AT1 of the outer circumferential groove 121, and an angle of tilt AT2 of the outer circumferential protrusion 123 may range from 2° to 6°, for example. The angle of tilt AT1 of the adhesive reservoir groove 118 and the angle of tilt AT1 of the outer circumferential groove 121 may be defined as an angle between a radial straight line HL, perpendicular to the optical axis LX, and a radial straight line TL1, parallel to the bottom of the adhesive reservoir groove 118 and the bottom of the outer circumferential groove 121. The angle of tilt AT2 of the outer circumferential protrusion 123 may be defined as an angle between a radial straight line HL, perpendicular to the optical axis LX, and a radial straight line TL2, parallel to the front end of the outer circumferential protrusion 123.

The circuit board 140 may further include a circuit board terminal 143 protruding rearward from the rear surface. The circuit board terminal 143 is a terminal for transmitting an electrical signal corresponding to the light received by the image sensor 147 to a control unit, external to the camera module 100, such as an electronic control unit (ECU) (not shown) in a vehicle.

After the circuit board 140, in which the image sensor 147 is mounted on the front, is housed in the inner space 102 of the front body 101, the circuit board 140 may be secured to the front body 101 by multiple bolts 149. For example, the multiple bolts 149 may pass through multiple bolt through-holes 142 provided in an outer circumference of the circuit board 140 and be threaded into multiple bolt coupling portions 107 provided on an inner surface of the front wall 106 of the front body 101. As a result, the circuit board 140 may make contact with the rear end of the bolt coupling portion 107, and the image sensor 147 may be spaced apart from the lens unit 130.

The rear body 150 includes a core member 180 and a resin molded portion 160. The core member 180 closes an opening at the rear of the front body 101 and is coupled to the front body 101. The core member 180 is made of metal, such as stainless steel, aluminum alloy, or copper alloy, and is joined to the front body 101. For example, the core member 180 may be manufactured by press-working a metal plate of uniform thickness.

The rear body 150 may further include a connector 151 electrically connected to the circuit board 140. For example, the connector 151 may be electrically connected to the circuit board terminal 143. An external connector (not shown), not included in the camera module 100, may be connected to the connector 151 for communication. For example, the external connector may be connected to an ECU in a vehicle for signal transmission.

The connector 151 may include a communication pin 152, an insulation portion 156, and a metal tube 158. The communication pin 152 may be made of, for example, a conductive material such as copper. The communication pin 152 may include a circuit board terminal coupling portion 153, which is inserted into a pinhole 144 on the rear end of the circuit board terminal 143 to enable coupling for signal transmission, an external connector coupling portion 154, which is inserted into an external connector (not shown) to enable coupling for signal transmission; and an intermediate portion 155, which connects the circuit board terminal coupling portion 153 with the external connector coupling portion 154.

The insulation portion 156 may be made of, for example, an insulating material such as plastic. When the circuit board terminal coupling portion 153 of the communication pin 152 is inserted into the pinhole 144 of the circuit board terminal 143, the circuit board terminal 143 is connected with the connector 151. In this case, the rear end of the circuit board terminal 143 is fitted into a front-end groove in the connector, provided in the insulation portion 156, and is supported on the inner surface of the front-end groove.

The metal tube 158 may be made of a conductive metal. The metal tube 158 may be spaced apart from the communication pin 152 and surround the insulation portion 156. The shape of the metal tube 158 may be tubular, surrounding the insulation portion 156. The core member 180 may include a connector through-hole 181 opened in the thickness direction, allowing the connector 151 to pass through the center.

The resin molded portion 160 is made of a synthetic resin and is joined to and supported on the core member 180. The resin molded portion 160 may include a coupling guide 161, a connector protector 170, and multiple bosses 175. When the rear body 150 is coupled to the front body 101, the coupling guide 161 is housed in the inner space 102 of the front body 101 and is not exposed to the outside the camera module 100.

When the rear body 150 is coupled to the front body 101, the coupling guide 161 may include multiple contact ribs 163, which make contact with the inner surface of the side wall 104 of the front body 101 and are spaced apart from each other. The planar shape of the coupling guide 161 may be a square shape with rounded corners. Multiple contact ribs 163 may be provided at corners of the coupling guide 161. The multiple contact ribs 163 may be protrusions protruding from the corners of the coupling guide 161. The multiple contact ribs 163 may prevent misalignment when coupling the front body 101 and the rear body 150.

The connector protector 170 surrounds the connector 151 and is joined to the connector 151. The resin molded portion 160 may further include a coupling hook 173. This hook, attached to the connector protector 170, couples the rear body 150 to the vehicle body, preventing separation.

The multiple bosses 175 are coupled to the core member 180, protruding rearward. The multiple bosses 175 are provided in plural to support the rear body 150, preventing rotation relative to the vehicle body. For example, the bosses may be coupled to the vehicle body using fasteners such as bolts.

The core member 180 may have multiple boss through-holes 185, which correspond to the positions of the multiple bosses 175. These holes allow the multiple bosses 175 to pass through the core member 180 and align with the coupling guide 161. The multiple boss through-holes 185 may be provided at the four corners of the square-shaped core member 180.

The core member 180 may further include a plurality of contact protrusions 182 protruding from the inner surface of the connector through-hole 181 toward the center of the connector through-hole 181. When the connector 151 is inserted to pass through the core member 180, the ends of the plurality of contact protrusions 182 may be electrically connected with the metal tube 158.

The front body 101 is made of metal. When the rear body 150 is coupled to the front body 101, the multiple contact ribs 163 make contact with the inner surface of the side wall 104. Subsequently, the rear end 105 of the front body 101 and an outer circumference of the core member 180 may be welded together, thereby joining the rear body 150 to the front body 101. For example, the front body 101 and the core member 180 may be welded together using a laser welding in which a laser is irradiated onto the rear end 105 of the front body 101 and the outer circumference of the core member 180.

The front body 101 and the core member 180, made of metal, surround the circuit board 140 and the image sensor 147. This may improve heat dissipation efficiency, allow external electrostatic discharge to bypass the circuit board 140 and the image sensor 147 and be discharged to outside the camera module 100, and shield against external electromagnetic interference. Therefore, malfunction or failure of the camera module 100 due to overheating, electrostatic discharge, or electromagnetic interference may be prevented.

For example, electrostatic discharge transmitted from outside the camera module 100 to the front body 101 may be discharged to outside the camera module 100 through the outer circumference of the core member 180, the contact protrusions 182 of the core member 180, and the metal tube 158 of the connector 151.

Additionally, since the rear body 150 includes both the core member 180, made of metal, and the resin molded portion 160, made of a synthetic resin, the manufacturing cost of a camera module may be reduced, and the weight may be reduced compared to cases where the rear body 150 is made solely of metal.

The rear body 150 may be manufactured by an insert injection molding, in which the core member 180 is insert-fitted inside an injection molding die (not shown), and molten synthetic resin is injected into the injection molding die and hardened. In the insert injection molding, the core member 180 may include bonding reinforcement grooves 186 and 188 on the surface. These grooves enlarge the bonding surface area between the resin molded portion 160 and the core member 180 to increase the bonding strength.

As shown in FIGS. 6 to 8, the bonding reinforcement grooves 186 and 188 may include a first bonding reinforcement groove 186, recessed around the inner surface of the connector through-hole 181 on the rear surface of the core member 180, and multiple second bonding reinforcement grooves 188, recessed around the inner surfaces of the multiple boss through-holes 185 on the rear surface of the core member 180.

In the insert injection molding, when the bonding reinforcement grooves 186 and 188 are filled with molten synthetic resin and the molten synthetic resin is hardened, a hook-like undercut that inhibits separation is formed between the resin molded portion 160 and the bonding reinforcement grooves 186 and 188 of the core member 180.

This may further increase the bonding strength between the resin molded portion 160 and the core member 180.

The bonding reinforcement grooves 186 and 188 may be formed, for example, by laser processing, where a laser is irradiated onto the surface of the core member 180, or by etching, where the core member 180 is masked and an etchant is applied to partially etch the surface of the core member 180. In the embodiment shown in FIGS. 6 to 8, the bonding reinforcement grooves 186 and 188 may be formed only on the rear surface of the core member 180, but alternatively, bonding reinforcement grooves may also be formed on the front surface of a core member.

In FIG. 9, a core member 190, which may be included in the camera module 100 according to the embodiment of the present disclosure, is disclosed in place of the core member 180 shown in FIG. 8. Referring to FIG. 9, the core member 190 closes an opening at the rear of the front body 101 and is coupled to the front body 101. The core member 190 is made of metal, such as stainless steel, aluminum alloy, or copper alloy, and is joined to the front body 101. The core member 190 may be manufactured, for example, by press-working a metal plate of uniform thickness.

The core member 190 may include a connector through-hole 191 and multiple boss through-holes 195. The connector through-hole 191 may be opened in the thickness direction, allowing the connector 151 to pass through the center of the core member 190. The multiple boss through-holes 195 may correspond to the positions of the multiple bosses 175. These holes allow the multiple bosses 175 to pass through the core member 180 and align with the coupling guide 161. The multiple boss through-holes 195 may be provided at the four corners of the square-shaped core member 190.

The core member 190 may further include a plurality of contact protrusions 192 protruding from the inner surface of the connector through-hole 191 toward the center of the connector through-hole 191. When the connector 151 is inserted to pass through the core member 190, the ends of the plurality of contact protrusions 192 may be electrically connected with the metal tube 158.

The rear end 105 of the front body 101 and an outer circumference of the core member 190 may be welded together, thereby joining the rear body 150 to the front body 101. For example, the front body 101 and the core member 180 may be welded together using a laser welding in which a laser is irradiated onto the rear end 105 of the front body 101 and the outer circumference of the core member 180.

The rear body 150 may be manufactured by an insert injection molding, in which the core member 190 is insert-fitted inside an injection molding die (not shown), and molten synthetic resin is injected into the injection molding die and hardened. In the insert injection molding, the core member 190 may include bonding reinforcement grooves 196 and 198 on the surface. These grooves enlarge the bonding surface area between the resin molded portion 160 and the core member 190 to increase the bonding strength.

The bonding reinforcement grooves 196 and 198 may include a first bonding reinforcement groove 196, recessed around the inner surface of the connector through-hole 191 on the rear surface of the core member 190, and multiple second bonding reinforcement grooves 198, recessed around the inner surfaces of the multiple boss through-holes 195 on the rear surface of the core member 190.

In the insert injection molding, when the bonding reinforcement grooves 196 and 198 are filled with molten synthetic resin and the molten synthetic resin is hardened, a hook-like undercut that inhibits separation is formed between the resin molded portion 160 and the bonding reinforcement grooves 196 and 198 of the core member 190. This may further increase the bonding strength between the resin molded portion 160 and the core member 190.

In the embodiment shown in FIG. 9, the bonding reinforcement grooves 196 and 198 may be formed only on the rear surface of the core member 190, but alternatively, bonding reinforcement grooves may also be formed on the front surface of a core member.

Figure 13:
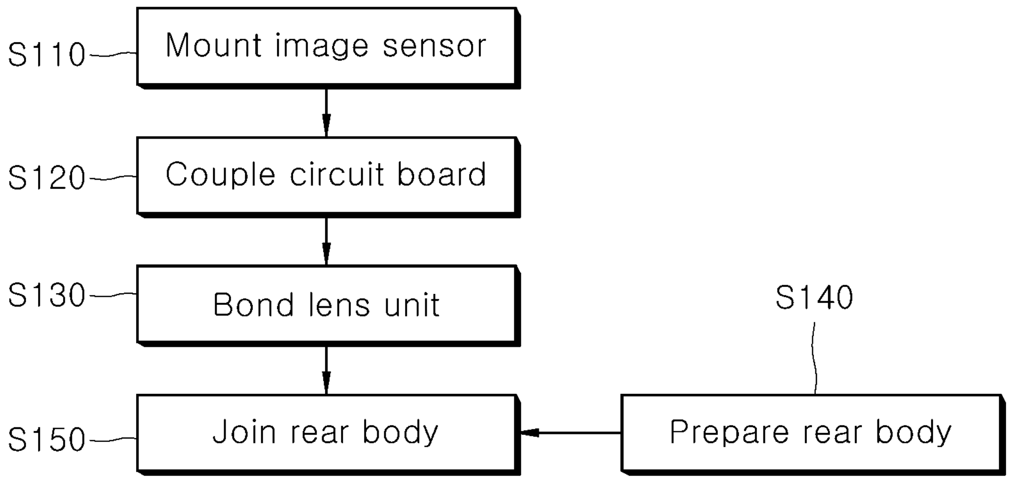
FIG. 13 is a block diagram showing a method for manufacturing a camera module according to an embodiment of the present disclosure.

FIG. 13 is a block diagram showing a method for manufacturing a camera module according to an embodiment of the present disclosure. Referring to FIGS. 2 to 5, FIG. 10, FIG. 12, and FIG. 13, a method for manufacturing a camera module 100 according to an embodiment of the present disclosure may include mounting S110 an image sensor, coupling S120 a circuit board, bonding S130 a lens unit, preparing S140 a rear body, and joining S150 a rear body.

The mounting S110 of an image sensor is a step of mounting an image sensor 147 on a circuit board 140. The image sensor 147 mounted on the circuit board 140 has already been described in the description of the camera module 100 according to the embodiment of the present disclosure. Therefore, redundant details will be omitted.

The coupling S120 of a circuit board is a step of coupling the circuit board 140 to a front body 101, such that the circuit board 140 is housed in an inner space 102 of the front body 101, which is made of metal. For example, a pair of bolts 149 may be utilized to couple the circuit board 140 to the front body 101. The coupling of the circuit board 140 to the front body 101 has already been described in the description of the camera module 100 according to the embodiment of the present disclosure. Therefore, redundant details will be omitted.

The bonding S130 of a lens unit is a step of inserting a lens unit 130, which has at least one lens 135, into a lens insertion hole 110 and bonding an end portion 115 of the lens insertion hole 110 to a bonding surface 133 of the lens unit 130, which faces the end portion 115, using adhesive.

For example, the adhesive may be cured under UV irradiation. The bonding S130 of a lens unit may include a step of injecting adhesive between the end portion 115 of the lens insertion hole 110 and the bonding surface 133 of the lens unit 130, and a step of curing the adhesive by UV irradiation to form an adhesive layer 138. The bonding of the bonding surface 133 of the lens unit 130 to the end portion 115 of the lens insertion hole 110 has already been described in the description of the camera module 100 according to the embodiment of the present disclosure. Therefore, redundant details will be omitted.

The preparing S140 of a rear body is a step of preparing a rear body 150, which includes a core member 180 made of metal and a resin molded portion 160 made of a synthetic resin, joined to and supported on the core member 180. The rear body 150 may further include a connector 151.

The preparing S140 of a rear body may include a step of an insert injection molding, in which the core member 180 is insert-fitted inside an injection molding die (not shown), and molten synthetic resin is injected into the injection molding die and hardened. The core member 180 may include bonding reinforcement grooves 186 and 188 on the surface. These grooves enlarge the bonding surface area between the resin molded portion 160 and the core member 180 to increase the bonding strength. The bonding reinforcement grooves 186 and 188 may be formed by laser processing. The rear body 150, which includes the core member 180, the connector 151, and the resin molded portion 160, has already been described in the description of the camera module 100 according to the embodiment of the present disclosure. Therefore, redundant details will be omitted.

The joining S150 of a rear body is a step of joining the rear body 150 to the front body 101 by welding the core member 180 and the front body 101. For example, the front body 101 and the core member 180 may be coupled by welding, such as laser welding. The joining of the front body 101 and the rear body 150 has already been described in the description of the camera module 100 according to the embodiment of the present disclosure. Therefore, redundant details will be omitted.

Although embodiments of the present disclosure have been described with reference to the accompanying drawings, these embodiments are provided for the illustrative purpose. It will be apparent to those skilled in the art that various modifications and equivalent embodiments can be made from these embodiments disclosed herein. Thus, the true technical scope of the disclosure should be defined by the following claims.

What is claimed is:

1. A camera module comprising:
an image sensor;
a circuit board on which the image sensor is mounted;
a front body housing the image sensor and the circuit board therein and having an opening;
a rear body including:
a core member that closes the opening, is coupled to the front body, is made of metal, and is joined to the front body; and
a resin molded portion that is joined to the core member and is made of a synthetic resin; and
a lens unit including at least one lens arranged to be aligned with an optical axis of the image sensor,
wherein the front body includes a lens insertion hole into which the lens unit is inserted,
wherein an end portion of the lens insertion hole and a bonding surface of the lens unit, which faces the end portion, are bonded to each other using adhesive, and
wherein the lens insertion hole includes:
an overflow prevention wall, positioned at the end portion and protruding along a closed curved path centered on the optical axis;
an adhesive reservoir groove formed from the overflow prevention wall in a stepped manner and positioned farther from the optical axis than the overflow prevention wall,
a plurality of outer circumferential protrusions protruding from the end portion in a stepped manner compared to a bottom of the adhesive reservoir groove; and
an uneven portion, wherein a plurality of outer circumferential grooves, formed from the plurality of outer circumferential protrusions in a stepped manner, are arranged alternately, the uneven portion positioned farther from the optical axis than the adhesive reservoir groove.

2. The camera module of claim 1, wherein the resin molded portion includes a coupling guide including a plurality of contact ribs contacting with an inner surface of the front body and spaced apart from each other.

3. The camera module of claim 2,
wherein a planar shape of the coupling guide is a square shape with rounded corners, and
wherein the plurality of contact ribs are provided at the corners of the coupling guide.

4. The camera module of claim 1,
wherein the adhesive is cured in response to being irradiated with ultraviolet (UV) rays, and
wherein a gap between the end portion of the lens insertion hole and the bonding surface of the lens unit widens as a distance from the optical axis increases.

5. The camera module of claim 4,
wherein a depth of the adhesive reservoir groove and a depth of the outer circumferential grooves increase as a distance from the optical axis increases, and
wherein a height of the outer circumferential protrusions decreases as a distance from the optical axis increases.

6. The camera module of claim 4, wherein an angle of tilt of the adhesive reservoir groove, an angle of tilt of the outer circumferential grooves, and an angle of tilt of the outer circumferential protrusions range from 2° to 6°.

7. The camera module of claim 1,
wherein the front body is made of metal, and
wherein the front body and the core member are welded together.

8. The camera module of claim 7, wherein the welding is a laser welding.

9. The camera module of claim 1,
wherein the rear body further includes a connector configured to be electrically connected with the circuit board, and
wherein the resin molded portion further includes a connector protector configured to surround the connector and be joined to the connector.

10. The camera module of claim 9, wherein the circuit board further includes a circuit board terminal protruding from the circuit board for transmitting an electrical signal generated by the image sensor to outside the camera module and configured to be connected with the connector.

11. A camera module comprising:
an image sensor;
a circuit board on which the image sensor is mounted;
a front body housing the image sensor and the circuit board therein and having an opening; and
a rear body including:
a core member that closes the opening, is coupled to the front body, is made of metal, and is joined to the front body; and
a resin molded portion that is joined to the core member and is made of a synthetic resin,
wherein the rear body further includes a connector configured to be electrically connected with the circuit board,
wherein the resin molded portion further includes a connector protector configured to surround the connector and be joined to the connector,
wherein the circuit board further includes a circuit board terminal protruding from the circuit board for transmitting an electrical signal generated by the image sensor to outside the camera module and configured to be connected with the connector, and
wherein the connector includes:
a communication pin configured to be inserted into the circuit board terminal;
an insulation portion configured to surround the communication pin and be made of an insulating material; and
a metal tube that is made of metal, is spaced apart from the communication pin, surrounds the insulation portion, and is joined to the connector protector.

12. The camera module of claim 11, wherein the core member includes contact protrusions configured to be electrically connected with the metal tube.

13. A method for manufacturing a camera module, the method comprising:

mounting an image sensor on a circuit board;

coupling the circuit board to a front body, so that the circuit board is housed in an inner space of the front body, made of metal;

preparing a rear body that includes a core member, made of metal, and a resin molded portion, made of a synthetic resin and joined to and supported on the core member; and joining the rear body to the front body by welding the core member and the front body, wherein the front body includes a lens insertion hole, and wherein the method further includes:

bonding a lens unit by inserting the lens unit, which has at least one lens, into the lens insertion hole and bonding an end portion of the lens insertion hole to a bonding surface of the lens unit, which faces the end portion, using adhesive, and wherein the lens insertion hole includes:

an overflow prevention wall, positioned at the end portion and protruding along a closed curved path centered on the optical axis;

an adhesive reservoir groove formed from the overflow prevention wall in a stepped manner and positioned farther from the optical axis than the overflow prevention wall, a plurality of outer circumferential protrusions protruding from the end portion in a stepped manner compared to a bottom of the adhesive reservoir groove; and an uneven portion, wherein a plurality of outer circumferential grooves, formed from the plurality of outer circumferential protrusions in a stepped manner, are arranged alternately, the uneven portion positioned farther from the optical axis than the adhesive reservoir groove.

14. The method of claim 13, wherein the preparing of the rear body includes:

an insert injection molding, wherein the core member is insert-fitted inside an injection molding die and molten synthetic resin is injected into the injection molding die and hardened.

15. The method of claim 14, wherein the core member includes bonding reinforcement grooves on a surface thereof, thereby enlarging a bonding surface area between the resin molded portion and the core member.

16. The method of claim 13, wherein the bonding of the lens unit includes:

injecting the adhesive between the end portion of the lens insertion hole and the bonding surface of the lens unit; and irradiating the adhesive with ultraviolet (UV) rays.

* * * * *